(12) United States Patent
Zhang et al.

(10) Patent No.: US 11,365,775 B2
(45) Date of Patent: Jun. 21, 2022

(54) COMMERCIAL VEHICLE AIR DISC BRAKE CALIPER ASSEMBLY

(71) Applicant: SHANDONG TOGET BRAKE SYSTEM CO., LTD, Zaozhuang (CN)

(72) Inventors: Zhongguo Zhang, Zaozhuang (CN); Zhijun Peng, Zaozhuang (CN); Chonghai Xu, Zaozhuang (CN); Chuanliang Yang, Zaozhuang (CN); Dameng Hu, Zaozhuang (CN); Bin Shi, Zaozhuang (CN)

(73) Assignee: SHANDONG TOGET BRAKE SYSTEM CO., LTD, Zaozhuang (CN)

( * ) Notice: Subject to any disclaimer, the term of this patent is extended or adjusted under 35 U.S.C. 154(b) by 580 days.

(21) Appl. No.: 16/345,804

(22) PCT Filed: May 4, 2018

(86) PCT No.: PCT/CN2018/085597
§ 371 (c)(1),
(2) Date: Apr. 29, 2019

(87) PCT Pub. No.: WO2019/161621
PCT Pub. Date: Aug. 29, 2019

(65) Prior Publication Data
US 2021/0324929 A1    Oct. 21, 2021

(30) Foreign Application Priority Data

Apr. 12, 2018  (CN) .......................... 201810327212.9

(51) Int. Cl.
*F16D 65/56* (2006.01)
*F16D 55/2265* (2006.01)
(Continued)

(52) U.S. Cl.
CPC ......... *F16D 65/568* (2013.01); *F16D 55/227* (2013.01); *F16D 55/22655* (2013.01);
(Continued)

(58) Field of Classification Search
CPC .... F16D 65/568; F16D 2125/40; F16D 65/52; F16D 65/56; F16D 65/62; F16D 55/2255;
(Continued)

(56) References Cited

U.S. PATENT DOCUMENTS 5,162,053 A  * 11/1992  Kowalski, Jr. .......... B08B 17/00
                                                                188/218 A
7,407,042 B2 *  8/2008  Banks ..................... F16D 7/021
                                                                 188/72.9
(Continued)

*Primary Examiner* — Robert A. Siconolfi
*Assistant Examiner* — Mahbubur Rashid
(74) *Attorney, Agent, or Firm* — CBM Patent Consulting, LLC

(57) ABSTRACT

The present invention relates to a commercial vehicle disc brake caliper assembly comprising a caliper body and a left guide pin component, right guide pin component, the main adjuster mechanism assembly, the driven adjuster unit are all mounted on the caliper body. The adjuster mechanism assembly adopts a gear clutch structure with anti-overload function; the driven adjuster unit adopts a circlip structure; the main adjuster assembly and the driven adjuster unit is connected by sprocket chain. The bottom of the main adjuster assembly and the bottom of the driven adjuster unit are connected to the three thread calibration bolt, which connected with bridage, the bridage are arranged inside of the brake caliper. The invention overcomes the problems which may occur during braking, such as uneven braking force, failure of clearance adjustment, deformation of adjuster mechanism, failure of braking, etc.

9 Claims, 20 Drawing Sheets

(51) Int. Cl.
*F16D 55/227* (2006.01)
*F16D 65/00* (2006.01)

(52) U.S. Cl.
CPC ..... *F16D 65/0075* (2013.01); *F16D 65/0081* (2013.01); *F16D 65/0087* (2013.01); *F16D 2250/0084* (2013.01)

(58) Field of Classification Search
CPC .............. F16D 55/226; F16D 65/66; F16D 2250/0084; F16D 2250/0081; F16D 2250/0087; F16D 65/60; F16D 65/64; F16D 55/2265; F16D 55/227; F16D 13/757; F16D 2055/0075; F16D 55/22655; F16D 65/0075; F16D 65/38
See application file for complete search history.

(56) References Cited

U.S. PATENT DOCUMENTS

| | | | | |
|---|---|---|---|---|
| 7,484,602 B2* | 2/2009 | Iraschko | ............... | F16D 65/183 188/196 BA |
| 7,926,626 B2* | 4/2011 | Iraschko | ............... | F16D 65/567 188/72.7 |
| 8,167,098 B2* | 5/2012 | Jessberger | ............... | B60T 5/00 188/264 A |
| 8,636,118 B2* | 1/2014 | Iraschko | ............... | F16D 65/18 188/71.8 |
| 8,684,146 B2* | 4/2014 | Iraschko | ............... | F16D 65/568 188/71.8 |
| 8,701,844 B2* | 4/2014 | Tsiberidis | ............. | F16D 65/847 188/218 A |
| 8,739,945 B2* | 6/2014 | Iraschko | ............... | F16D 65/543 |
| 8,827,050 B2* | 9/2014 | Iraschko | ............... | F16D 65/56 188/71.8 |
| 9,746,043 B2* | 8/2017 | Asen | ............... | F16D 65/543 |
| 9,874,259 B2* | 1/2018 | Tropp | ............... | F16D 65/18 |
| 9,989,117 B2* | 6/2018 | Baumgartner | ........ | F16D 55/225 |
| 2007/0209890 A1* | 9/2007 | Iraschko | ............... | F16D 65/567 188/203 |
| 2008/0217125 A1* | 9/2008 | Iraschko | ............... | F16D 65/567 188/196 BA |
| 2009/0260930 A1* | 10/2009 | Lotz | ............... | F16D 65/567 188/196 BA |
| 2011/0155518 A1* | 6/2011 | Iraschko | ............... | F16D 65/567 188/71.8 |
| 2011/0203883 A1* | 8/2011 | Iraschko | ............... | F16D 65/56 188/71.8 |
| 2011/0203884 A1* | 8/2011 | Iraschko | ............... | F16D 65/56 188/71.8 |
| 2011/0203885 A1* | 8/2011 | Iraschko | ............... | F16D 65/568 188/71.8 |
| 2011/0203886 A1* | 8/2011 | Iraschko | ............... | F16D 65/567 188/71.8 |
| 2014/0076673 A1* | 3/2014 | Tsiberidis | ............... | F16D 55/22 188/73.1 |
| 2014/0166412 A1* | 6/2014 | Howard | ............... | B60T 1/065 188/71.8 |
| 2014/0238788 A1* | 8/2014 | Tropp | ............... | F16D 65/18 188/71.8 |
| 2015/0192181 A1* | 7/2015 | Asen | ............... | F16D 65/568 188/71.8 |
| 2016/0032996 A1* | 2/2016 | Baumgartner | ........ | F16D 55/225 188/71.9 |

* cited by examiner

COMMERCIAL VEHICLE AIR DISC BRAKE CALIPER ASSEMBLY

TECHNICAL FIELD

The invention relates to a commercial vehicle disc brake caliper assembly, belongs to the technical field of automobile equipment.

BACKGROUND TECHNIQUE

Regarding the current technology, the existing commercial vehicle disc brake caliper assembly has the following deficiencies: The steel cover is a stamped material, this location is a loaded position, repeatedly braking shocks will cause deformation, resulting in seal failure; moreover, There is a risk of fracture, it is Security risks; furthermore, the original bridage rubber boot seaing effect is not good enough, it could not be effectively waterproof and dustproof; the adjuster mechanism is a spring structure, the spring will occur fatigue, then cause brake life shorten; the adjuster mechanism unit uses one-way roller bearing, which works with steel ball, there are many problems such as short service life, high temperature performance failure, difficult produce process, uneven brake force, gap adjuster function failure, deformation of the adjuster mechanism, brake failures, etc.

The adjustment mechanism is the critical component in the commercial vehicle disc brake caliper and plays a decisive role. Its working principle is: the brake lever is pressed down when the brake gap is too big, then it drive the dial sleeve rotate, the Self-adjusting shaft will rotate together with the dial sleeve, under the forces of bearing ball and spring, the dial sleeve also will rotate together with the Self-adjusting shaft; since the calibration bolt is connected with dial sleeve, then the calibration bolt will rotate with the dial sleeve too, so movement will make up the brake wearing gap, then achieve the brake function. But the brake calibration bolt will not move when the brake gap is in specified position, under such condition, the self-adjusting shaft and dial sleeve will make relative motion, the steel ball will roll between the ball sockets, it also need spring's forces to overcome the brake lever forces, so that the adjuster mechanism parts will not been broken though overload. But the brake calibration bolt will move when the slack adjuster is becoming smaller, the self-adjuster shaft will adjuster dial sleeve to rotate, then cause calibration bolt move to overcome the wear gap.

The traditional adjuster mechanism use one-way roller bearing, the steel ball will run between the ball sockets, the self-adjuster shaft and dial sleeve will move relatively, it can overcome the overload under the ball running, then to protect the adjuster mechanism in good function. The traditional adjuster mechanism fixing plate material are injection plastic material.

The weak point of traditional adjuster mechanism are:
1. there is Higher size fit requirements for one-way roller bearing and dial sleeve, the size bigger or smaller, would cause Loose or deformed, it is big potential risk;
2. There is higher size requirement for the ball sockets, the steel ball will choked if the ball sockets size are not good.
3. The fixing plate material are injection plastics, it can not avoid of deformation when the brake temperature becomes higher and higher, moreover, Frequent brake will also cause plate deformation, then result brake adjuster mechanism failure.
4. the compressed spring are put into dial sleeve, it works frequently, also the inside temperature will become higher, then the spring forces will become weaker and weaker, it cause brake torque weaker too, then cause adjuster mechanism failure.

The biggest weak point of the traditional adjuster mechanism is: the adjuster mechanism will work for every brakes, brake lever will move Repeatedly together with dial sleeve, the movement of dial sleeve will cause repeatedly exercise of adjuster and Overload protection, moreover, the Turning angle is 90 degree, so the adjuster distance is too big, it will cause adjuster gap over regulation, then cause brake locked, furthermore, the steel balls exercise frequently, the overload will reduce the life.

SUMMARY OF THE INVENTION

To avoid traditional brake problems, to present a new designed commercial vehicle disc brake caliper complete.

The technical proposal is as follows:

commercial vehicle air disc brake caliper complete includes: brake caliper body, brake carrier installed on the outside of caliper, they are connected by guide and bolts on left and right side;

The adjuster mechanism unit use gear clutch structure to realize overload.

The driven adjuster unit, use circlip r fixture, the shaft use nothing spring.

The main adjuster mechanism and the driven adjuster unit are located between the left guide pin and the right guide pin, the top are connected through the sprocket chain, the bottom are connected to the other side of the caliper body through three thread calibration bolt inside of the bridage, the brake lever are located between the main adjuster mechanism and the driven adjuster unit. There are roller bearings which located outside of the brake lever, the bottom of the brake lever are located on bridage unit, there is one return spring under the bottom of the bridage.

Preferably, the left guide pin component includes a hexagon head bolt which is connected to the caliper body, and the outside of the hexagon head bolt is sleeved with short guide pin, short guide bushing, and support sleeve, there is skeleton oil seal between short guide pin and caliper; the height of the short bush is 25-35 mm, preferably 30 mm.

Preferably, the right guide pin component includes the second hexagon socket head bolt, which is connected to the caliper body, the outside of the second hexagon head bolt is sleeved with long guide pin, long bushing, there is long lug cap on the top of it; there is lock ring under the bottom of it, the lock ring is connected with rubber cover.

Preferably, the main adjuster mechanism includes a main rotation shaft, a reinforcing plate and a fixing plate are sleeved at the head of the main rotation shaft, and a nylon pad is arranged between the reinforcing plate and the fixing plate. The rotation shaft is provided with a fixed sleeve, supporting steel balls, a dial sleeve, a support bearing, a limiting sleeve, steel balls, a clutch gear sleeve and an out dial sleeve.

The outer side of the limiting sleeve is connected with a tension spring, there is thick clutch washer and thin clutch washer between the limiting sleeve and clutch gear sleeve; There is limiting plate on one side of the dial sleeve, and there is clutch gear ring matched with clutch gear sleeve inside of the dial sleeve; on the other side of the dial sleeve, there is supporting steel balls, bearing washer and compression spring in sequence; under the bottom of the main adjuster shaft, there is inner dial block and compression spring, the bottom are cold riveting;

Preferably, the fixing plate is a metal plate, one end of the fixing plate is provided with a hook-shaped bend; the fixing sleeve is provided with a guide fixing frame; the left and right sides of the fixing sleeve have slottings, the fixing sleeve is provided with a spherical convex surface on one side. The other side of the fixed sleeve is provided with fixed sleeve ball sockets, the spherical convex surface is matched with the fixed plate, and the hook-shaped bend is connected within the slotting. The supporting steel balls are arranged in the fixed sleeve ball sockets.

Preferably, the dial sleeve has a fork structure. The center of the dial sleeve is provided with a guide groove and the guide groove is matched with the fixed sleeve. On one side of the dial sleeve, there are many small steel ball sockets, on the other side of the dial sleeve, there are many big steel ball sockets; The shape of the big ball sockets include big arcs and small arcs, and the big arcs and small arcs are connected by two arcs. The dial sleeve big steel ball sockets are designed into special structure. The advantage of this design is which can guarantee that the steel balls can have a moving track surface, to ensure the smooth and free rolling.

We designed guide groove inside of the dial sleeve, it is connected with fixing sleeve, which can ensure the dial sleeve will never exceed the Range rotation.

Preferably, the upper surface of the limiting sleeve is matched with the lower surface of the dial sleeve; There are first limiting steel ball sockets on upper end surface of the limiting sleeve, the balls are placed into the sockets, and fixed by extension spring; There are second limiting ball sockets on the under surface of the limiting sleeve, with a concave structure, also the balls are placed into it.

Preferably, the tension spring is provided with a hook for fixing, the upper part of the tension spring is fixed by a hook, and the lower part of the tension spring is fixed together with limiting sleeve by a hook.

Preferably, the support bearing is made of a kind of high-temperature resistant and high-strength plastic material, which adopts an up-and-down dislocation structure. The advantage of the design is that it adopts an up and down dislocation structure to facilitate the bearing steel ball, just to be embedded into the bearing seat.

Preferably, the limiting plate is a concave structure, and ten limiting protrusions are staggered from each other inside the limiting plate, and five uniformly-distanced supporting protrusions are arranged outside of the limiting plate. The advantage of this design is that the limit plate not only has a limit function to prevent axial movement, but also has a limit function of radial movement.

Preferably, the inside of the clutch sleeve cooperates with the main rotation shaft, there are clutch gear sleeve ball sockets on the outside of the clutch sleeve. The upper end surface of the clutch gear sleeve is flat, and the rolling rack is evenly distributed on the lower surface of the clutch gear sleeve; The upper surface of the clutch gear ring is uniformly provided with rolling racks. The upper surface of the clutch gear ring is matched with the lower surface of the clutch gear sleeve, clutch ring gear ball sockets are arranged on the lower surface of the clutch gear ring, the supporting steel balls are placed into the clutch gear ring ball sockets; there are limited position slot which uniformly distributed inside of the clutch gear ring; there are also limiting seats which are uniformly distributed outside of the clutch gear ring and out dial sleeve.

Preferably, the outer sleeve is a cylindrical sleeve. The sleeve is formed by crimping a planar body. The two sides of the planar body are alternately provided with bumps and slots, and the upper part of the sleeve is provided with multiple sunroof openings, the sleeve is also provided with a viewing hole, there is a limiting bar in the middle of the viewing hole. The inner wall of the lower part of the sleeve is provided with five raised ribs. The outer wall of the sleeve is provided with a protruding tooth. The bottom of the sleeve is installed with vents and limiting port. The advantage of this design is that the vents and limiting openings facilitate the heat dissipation of the springs, moreover, it is better for the movement and limit of the inner dial.

Preferably, the inner dial sleeve is an irregular prismatic structure on both sides, The inner dial sleeve is installed at the bottom of the outer dial sleeve for limiting and supporting the compression spring.

Preferably, a driving sprocket is connected to the end of the main adjusting shaft, a driven sprocket is arranged at the top of the driven adjusting unit; the driving and the secondary driving sprocket are connected through a chain. A plastic dust cover is arranged at the joint of the driven adjusting unit and the caliper body, a sealing gasket is arranged at the joint of the plastic dust cover and main adjuster mechanism, a torque protector is arranged at the top of the main adjusting shaft, which is sealed by a rubber cover.

Preferably, a cover is disposed under the bottom of caliper body, a shaft seal is disposed at the joint of the cover and tappet rubber; the bottom cover are fixed on the caliper body by four bolts.

Preferably, one side of the caliper body is provided with a vent, the end of the vent is installed with a dustproof net, and the outer side of the vent is provided with a clamp plate.

Preferably, the dust cover of the bridage is a self-locking spring leaf frame structure.

The beneficial effects of the present invention are:

1. In the caliper assembly of the present invention, the left guide pin adopts a structure in which the support sleeve matching with guide pin, the height of the short sleeve is lengthened from 20 mm to 30 mm, which increased the sliding stroke, also it increased the short sleeve wear resistance, moreover, it has better guide function;

We concealed the rubber boot bearing, replaced by bushing with many oil grooves structure, we installed waterproof and dustproof cap, the structure not only solves the problem of the rubber high-temperature-deformation, but also improves the wear resistance and stability of the pins.

2. for the old structure, the pin boot structure is a kind of rubber with skeleton, the other side is fixed with lock ring, normally the rubber are easily damaged, it is also very difficult to assembly the lock ring into the guide pin. In order to resolve the problem, the new invention designs a skeleton seal of overall structure, which replace the pin boot and lock ring, it is a very simple part, but much more easy to assembly, it is the same function with pin boot, but improved the sealing performance. The short pin also made a little size change in order to match the skeleton oil seal, but it is much easier for machining of the new short pin, the improved skeleton seal is better sealed and more consistent with the pin. The waterproof and dustproof function is improved, it avoid the problem of the pin dust and never cause jam and stuck.

3. The bottom cover now are casting material with thickened integral structure, which replaces the stamped dustproof plate, the casting thickness and strength is higher, After the sealing ring, we can also coat with sealant, it improved the sealing performance. Moreover, since the casting cover strength and hardness is higher, so only 4 bolts can be used to fasten on the caliper, so half of the bolts can be fixed. Reduced the difficulty in the processing of the caliper body and some unnecessary processes.

4. In the adjuster mechanism assembly of the present invention, the main adjustment mechanism of the gear clutch against overload function is adopted, and the adjuster mechanism assembly is changed from the main adjustment of the original one-way bearing structure to the gear clutch structure. The regulator of this structure is adopted. The main assembly is formed by the combination of fixing plate, fixing sleeve, transfer sleeve, limiting sleeve and other parts. The adjuster function is realized through the rolling of the steel ball. The limiting sleeve, the clutch gear sleeve, the clutch gear ring, the outer dial sleeve, the clutch wacher, the bearing washer and the inner dial sleeve form a driven adjuster unit, which utilizes the slipping of the steel ball of the clutch ring to achieve the overload protection function.

The main adjuster assembly cancels the one-way bearing, cancels the injection molding fixing plate, the outer sleeve is not only set adjust the observation holes, but also adopts a stamped and locked structure, added heat dissipation window, which not only effectively improves the adjuster flexibility. But also improves the brake life through special ventilation structure, Strengthen the cooperation of internal parts and work stability, overcomes the problems such as uneven braking force, gap adjustment failure, adjustment mechanism deformation, brake failure and other issues, The structure will greatly enhance the brake Safety, stability and service life.

5. The driven adjuster unit in the present invention completely concealed the spring and changes into the circlip structure. The circlip spring structure is simple and long service life, particularly, in order to ensure the self-adjusting fixing plate's stability, the high-strength retaining locked ring is adopted on the self-adjusting rotating shaft, which firmly fixed at the predetermined position, it is stable and not easy to slip or fall off.

6. In the present invention, the bridge dust cover adopts a unique self-locking skeleton structure, which changes the original common simple skeleton structure. This structure is designed by the strength and elasticity of the skeleton. The circular skeleton not only has sufficient strength, Moreover, with the setting elasticity, the rubber sheet-like skeleton is treated with vulcanized rubber, which not only has a dustproof and waterproof function, but also has the self-locking function, the spring sheet can elastically lock the threaded pushing rod, When the brake is working, the threaded push rod does not rotate easily. This effectively ensures the threaded push rod to be secured in the bridge and not move easily, thus ensuring the normal and stable braking slack, not causing continuous locking or dragging, problem.

Figure 1:
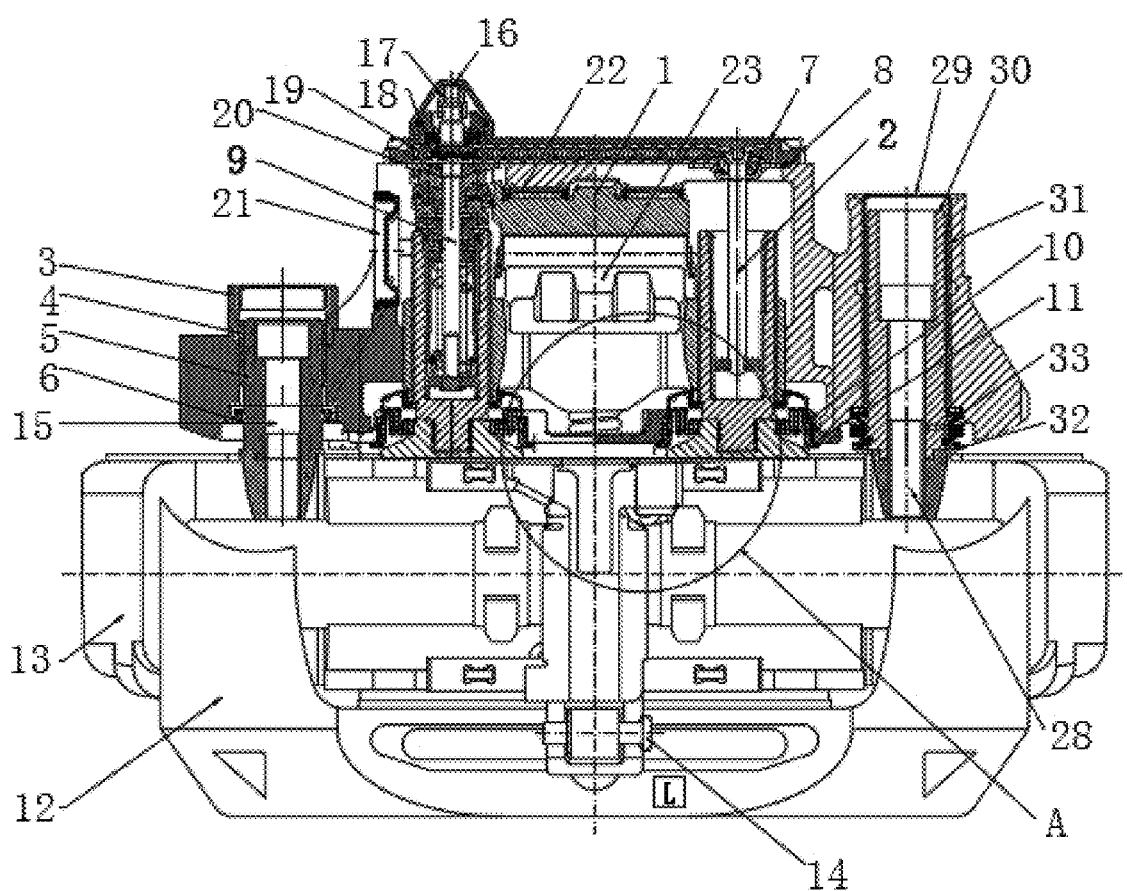
FIG. 1 is a schematic diagram of the present invention.
Figure 2:
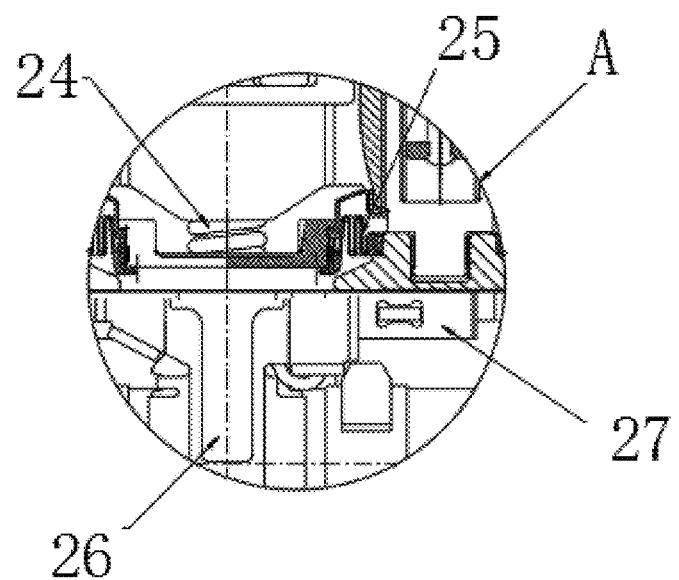
FIG. 2 is an enlarged view of portion A of FIG. 1 of the present invention.

In the drawing: 1, brake lever; 2, driven adjuster unit; 3, support sleeve; 4, short bushing; 5, short pin; 6, skeleton oil seal; 7, plastic dust cover; 8, Seal; 9, the main adjuster mechanism assembly; 91, the main adjustment shaft; 92, strengthening plate; 93, nylon pads; 94, fixed plate; 95, fixed sleeve; 951, fixed sleeve ball socket; 96, supporting steel ball; 97, transfer sets; 971, transfer sets of small ball socket; 972, dial groove; 973, transfer sleeve large ball socket; 98, support bearings; 99, extension spring; 910, limit sleeve; 9101, the first limit set of ball socket; 9102, second limiting sleeve ball socket; 911, adjusting steel ball; 912, thick clutch gasket; 913, thin clutch gasket; 914, limit plate; 915, clutch gear sleeve; 9151, clutch gear ball socket; 916, clutch gear ring; 9161, clutch gear ball socket; 917, bearing washer; 918, compression spring; 919, outer sleeve; 9191, rib; 9192, bump; 9193, slot; 920, inner Dial sleeve; 10, bridage dust cover; 11, bottom cover; 12, brake caliper body; 13, brake carrier; 14, pin; 15, hexagonal bolt; 16, rubber cover; 17, torque protector; 18, sprocket; 19, chain; 20, plastic strips; 21, plugging; 22, roller bearing; 23, bridage assembly; 24, return spring; 25, shaft seal; 26, first Hexagon bolt; 27, brake pad compression springs; 28, second hexagon bolt s; 29, long lug caps; 30, long guide sleeves; 31, long bushings; 32, lock ring; 33, Guide sleeve dust cover; 34, ventilation holes.

DETAILED DESCRIPTION

The present invention will be further described below with reference to the accompanying drawings and embodiments, but it is not limited to that.

Example 1

As shown in FIGS. 1 to 31, this instance provides a commercial vehicle disc brake caliper complete. The disc brake caliper complete mainly includes the following parts:

The brake caliper body 12 has a brake carrier 13 mounted on the outside of the caliper body 12, a pin 14 and a first hexagon bolt 26. The caliper body 12 has one end mounted on one side. There is a left guide pin and a right guide pin;

The main adjuster assembly 9 adopts a brake gap adjuster structure with a gear clutch anti-overload function;

driven adjuster unit 2, adopt the circlip structure;

the main adjuster assembly 9 and the driven adjuster unit 2 are located between the left guide pin and the right guide pin, it is connected by chain and sprocket between the top of the main adjuster assembly 9 and the top of the driven adjuster unit 2; there are bridage dust cover under the bottom of the main adjuster mechanism assembly 9 and the driven adjuster unit 2, which connected with bridage 23, the brake lever 1 is located between the main adjuster mechanism assembly 9 and the driven adjuster unit 2, which connected with the main adjuster mechanism assembly 9 with fork, the outer side of the upper part of the brake lever 1 is provided with roller bearings 22, and the bottom of the brake lever 1 is the bridage 23, there is a return spring 24 under the bottom of the bridage, the bridage are located in the inside of the caliper body 12. The pin 14 is used to connect the pressure plate on the two friction pad with the caliper body 12.

Figure 7:
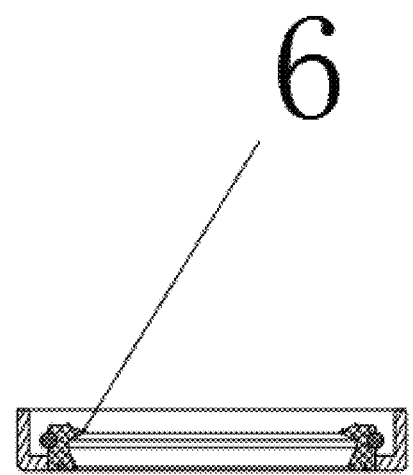
FIG. 7 is the structure diagram of the skeleton oil seal of the invention.
Figure 8:
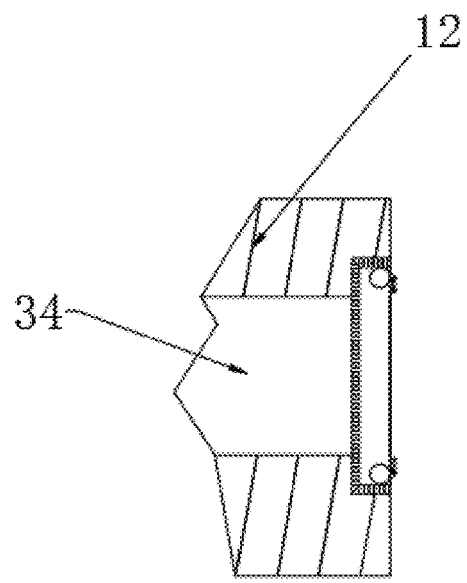
FIG. 8 is a schematic diagram of the ventilation hole of the invention.
Figure 9:
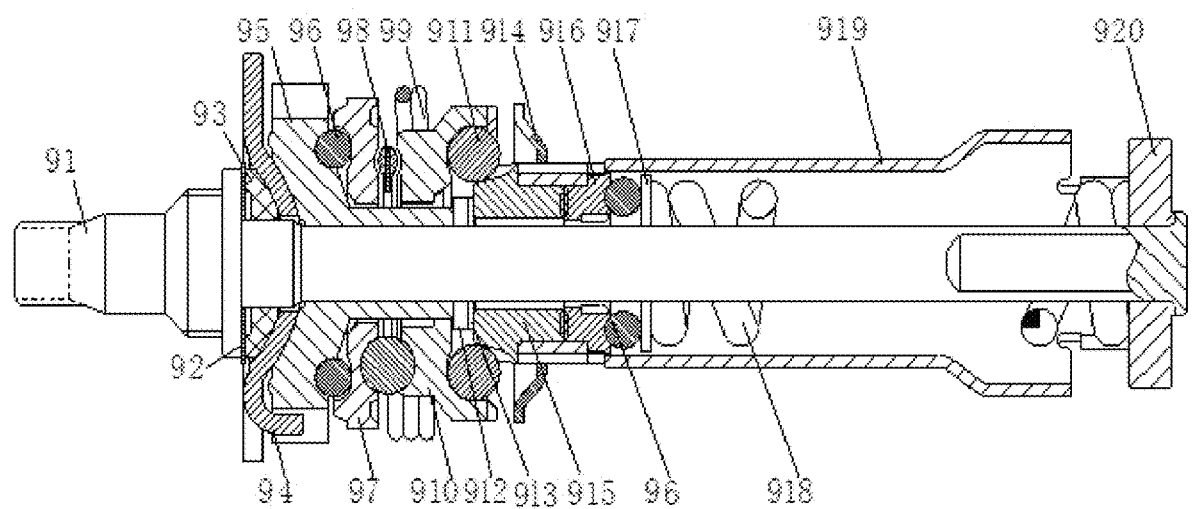
FIG. 9 is a sectional view of the overall structure of the main adjuster mechanism of the invention.
Figure 10:
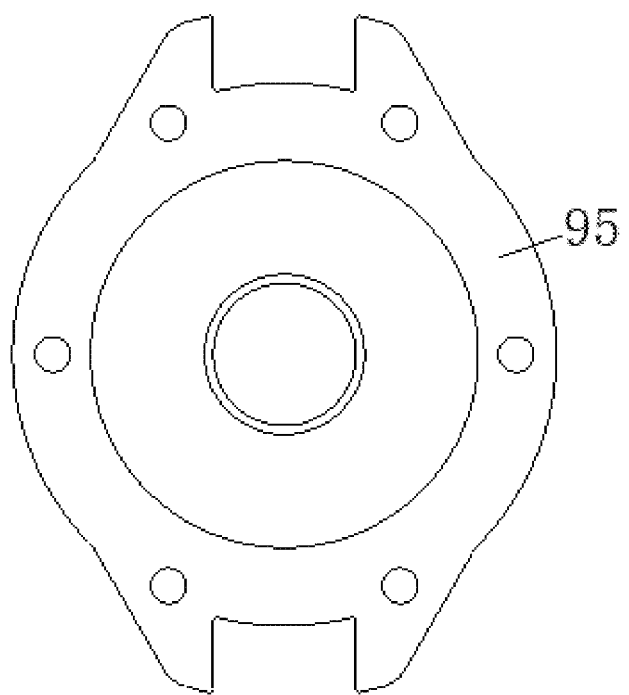
FIG. 10 shows the front diagram of the fixed sleeve of the adjuster mechanism of the invention.
Figure 11:
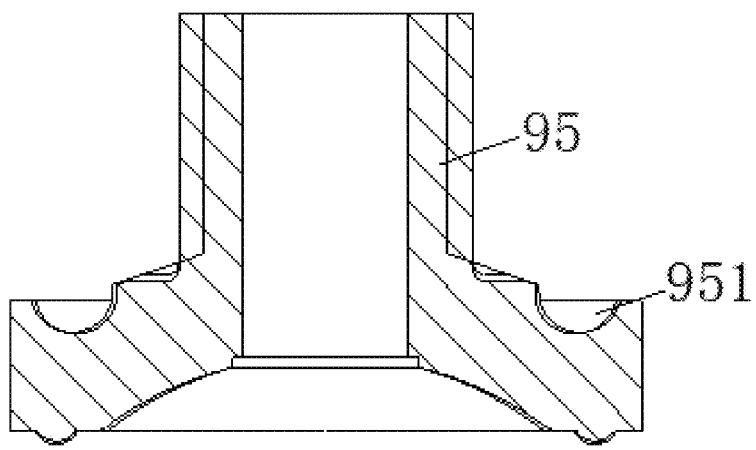
FIG. 11 is a transverse sectional view of the fixed set of the adjuster mechanism of the invention.
Figure 12:
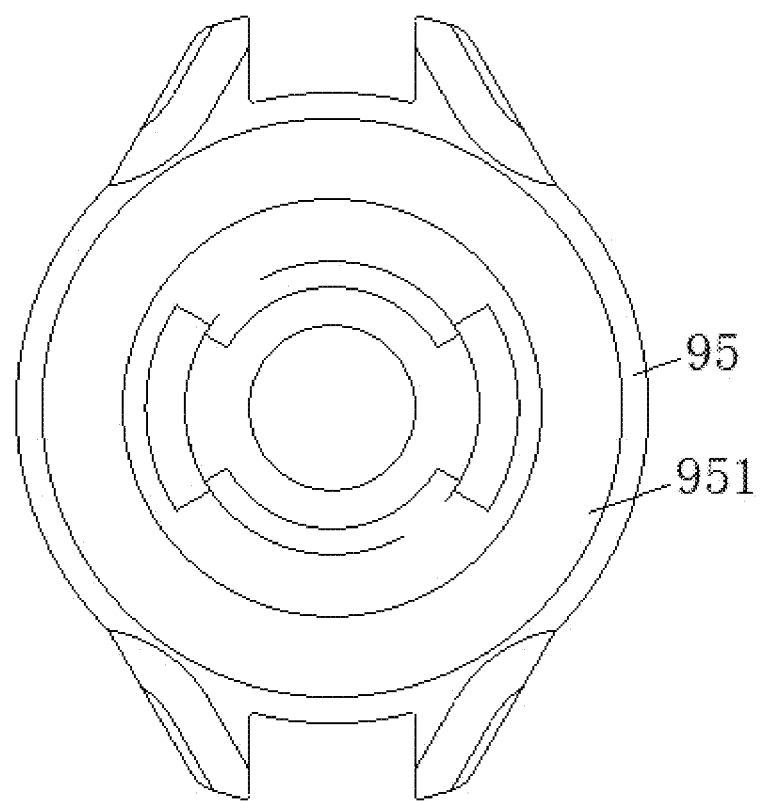
FIG. 12 shows the back diagram of the fixed sleeve of the adjuster mechanism of the invention.
Figure 13:
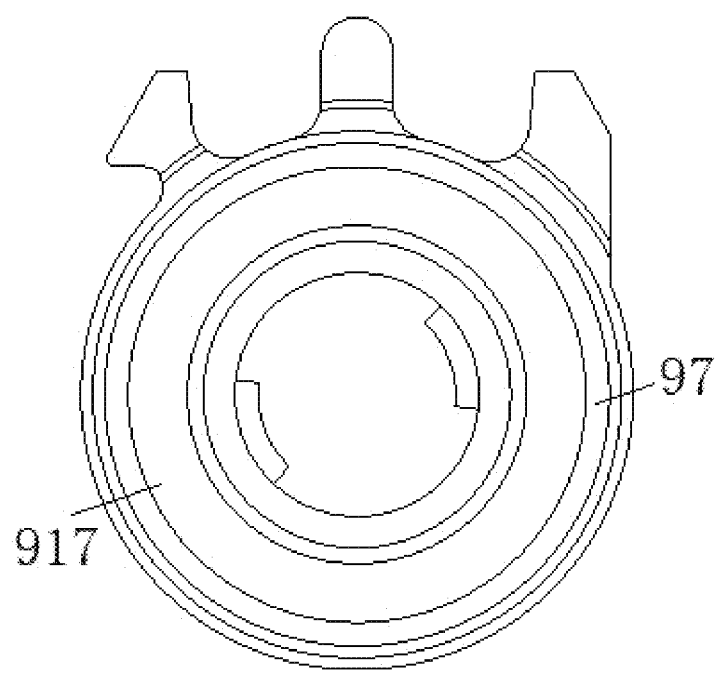
FIG. 13 is a positive schematic diagram of the allocation sleeve for the adjuster mechanism of the invention.
Figure 14:
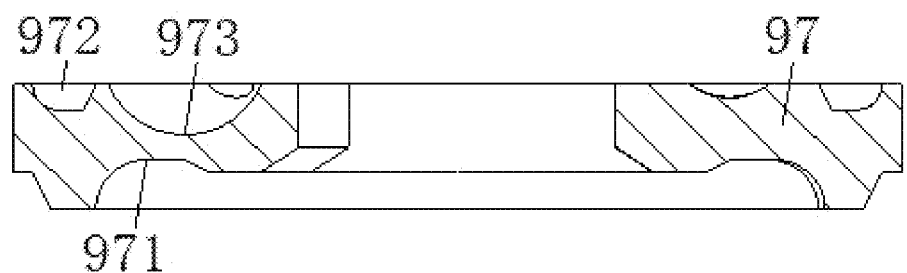
FIG. 14 is a transverse sectional view of the allocation sleeve of the main adjuster mechanism of the invention.
Figure 15:
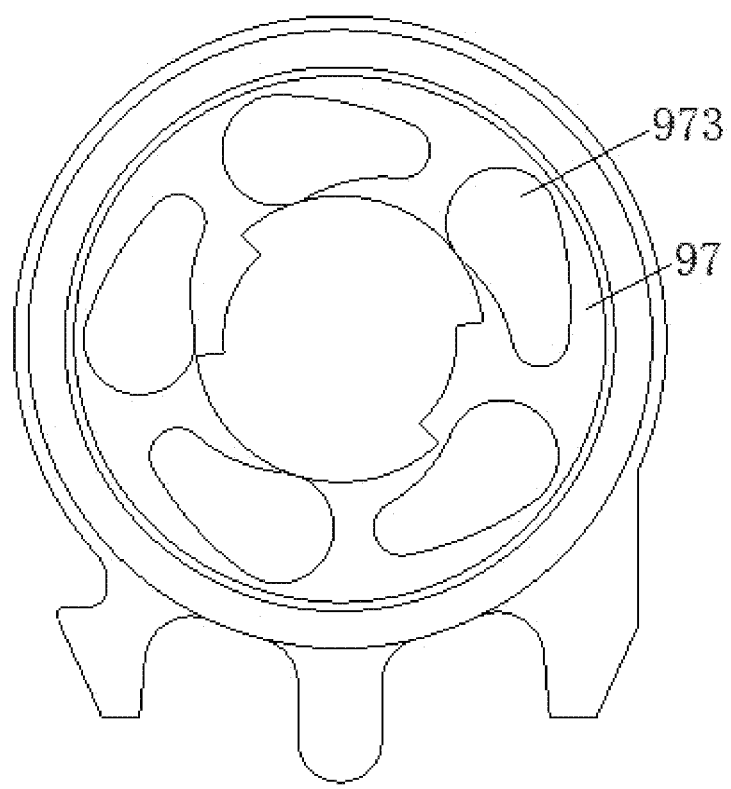
FIG. 15 is a schematic diagram of the back of the allocation sleeve for the adjuster mechanism of the invention.
Figure 16:
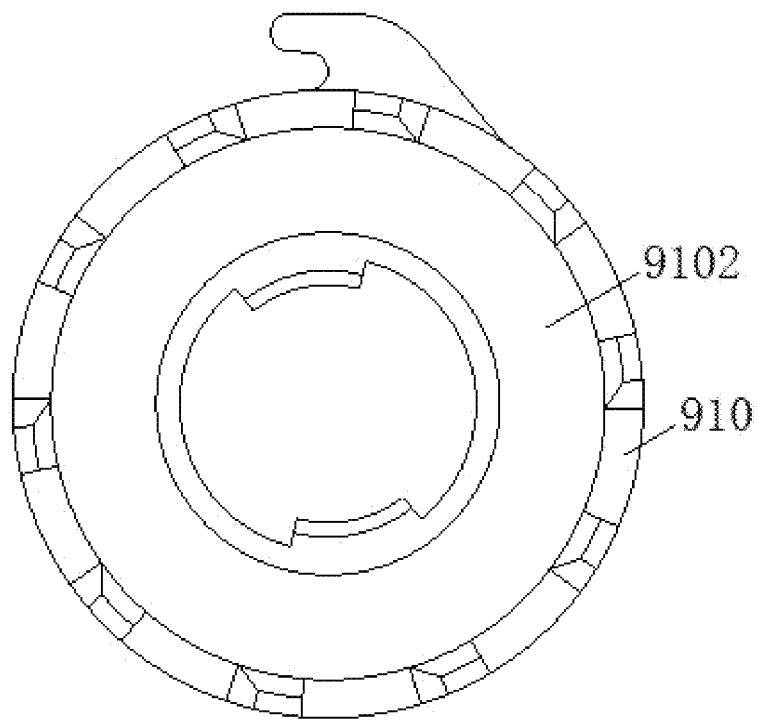
FIG. 16 is a positive schematic diagram of the limit set of the main adjuster mechanism t of the invention.
Figure 17:
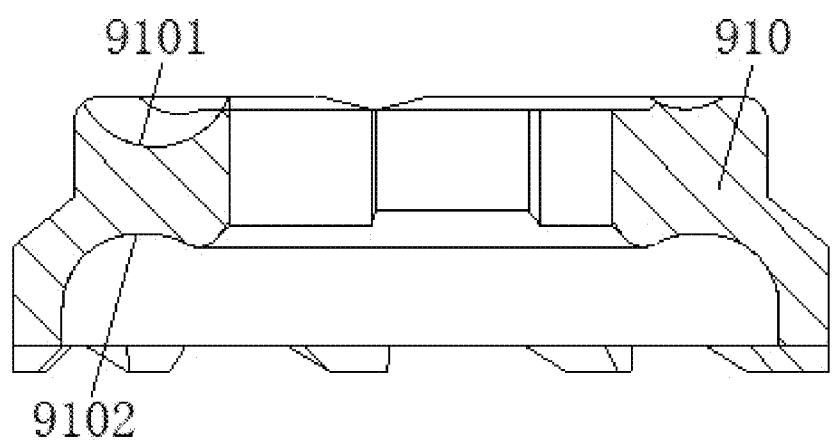
FIG. 17 is a transverse sectional view of the limit set of the main adjuster mechanism of the invention.
Figure 18:
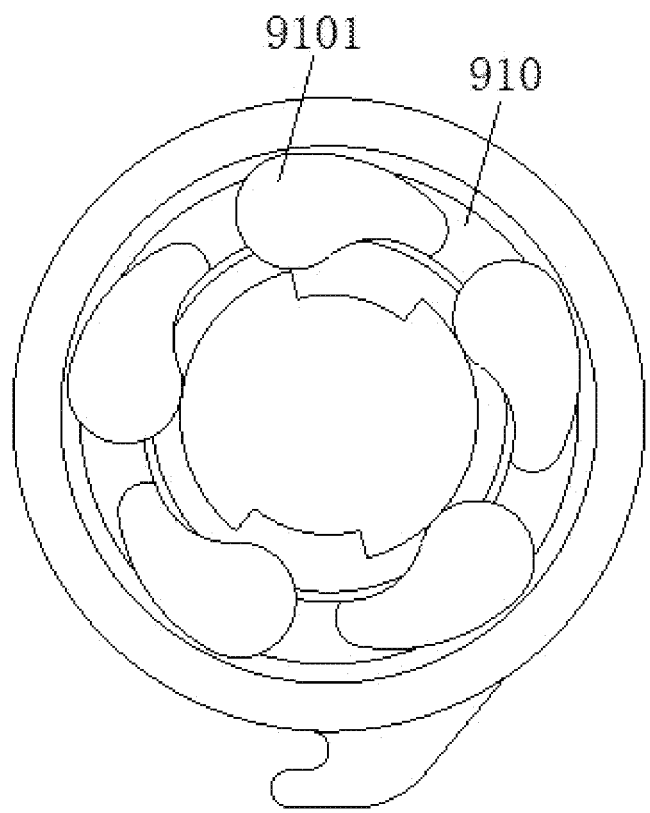
FIG. 18 shows the back diagram of the limit sleeve of the main adjuster mechanism of the invention.
Figure 19:
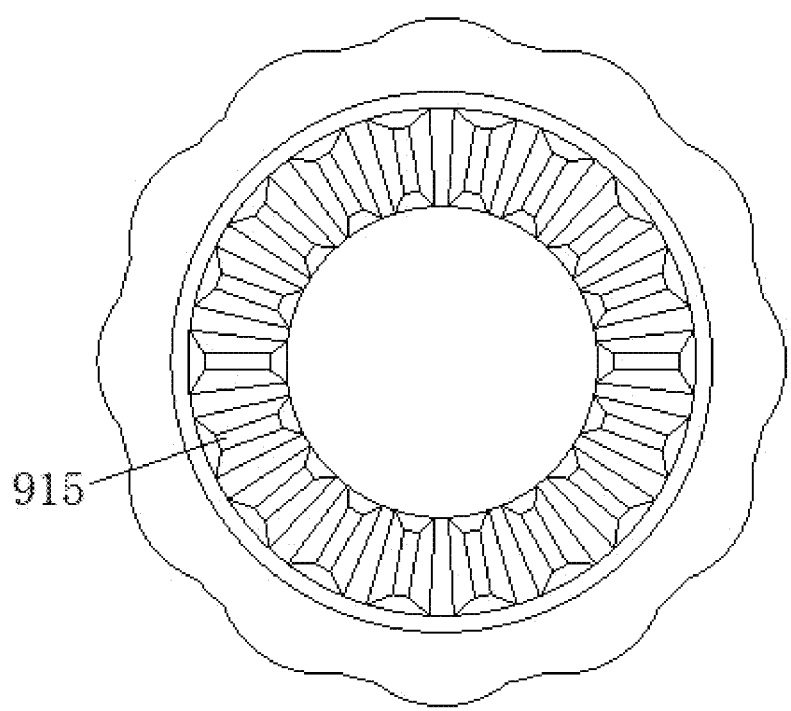
FIG. 19 is the front diagram of the clutch gear sleeve for the adjuster mechanism of the invention.
Figure 20:
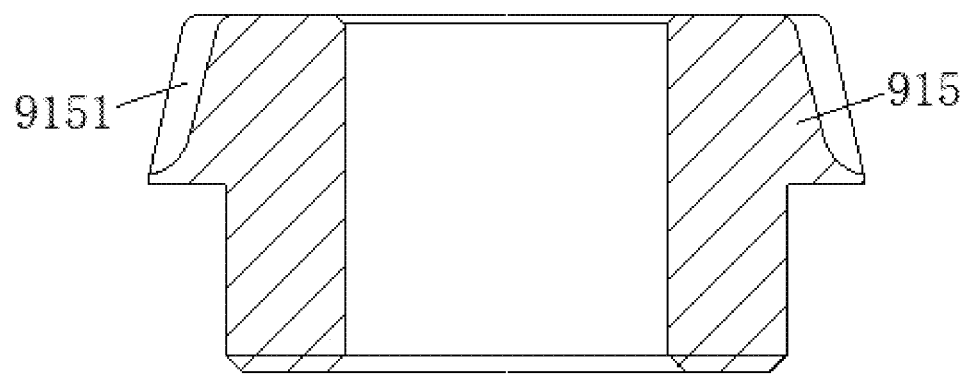
FIG. 20 is the transverse section view of the clutch gear sleeve of the adjuster mechanism of the invention.
Figure 21:
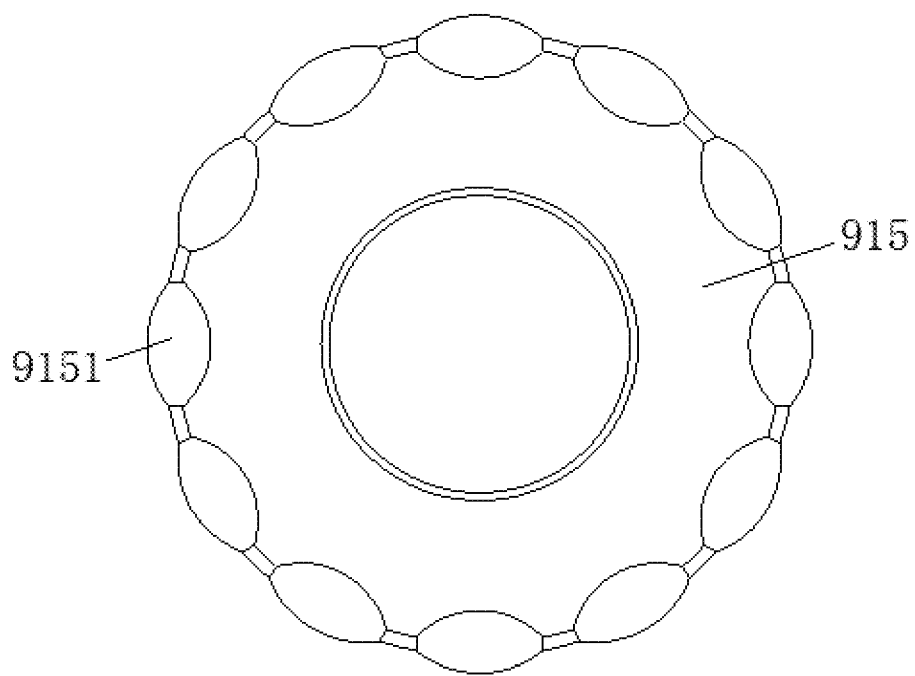
FIG. 21 is a schematic diagram of the reverse gear sleeve of the main adjuster mechanism of the invention.
Figure 22:
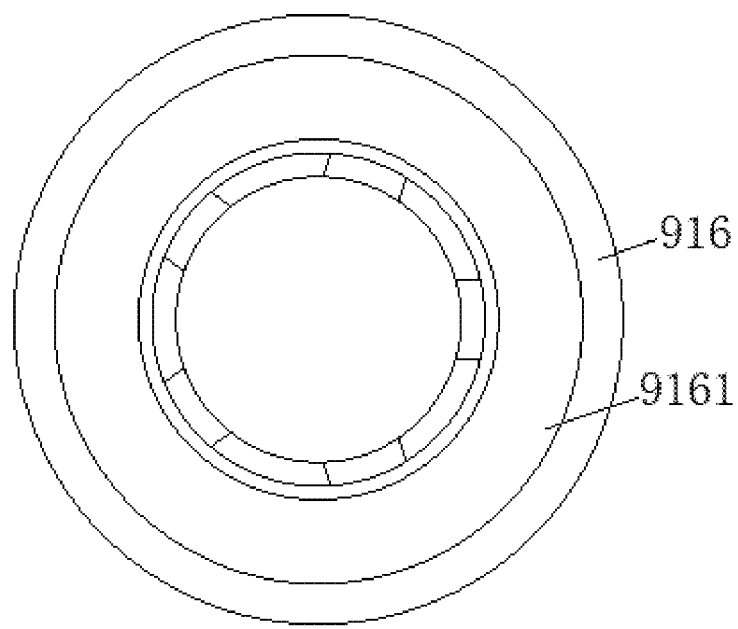
FIG. 22 is the front diagram of the clutch gear unit of the main adjuster mechanism of the invention.
Figure 23:
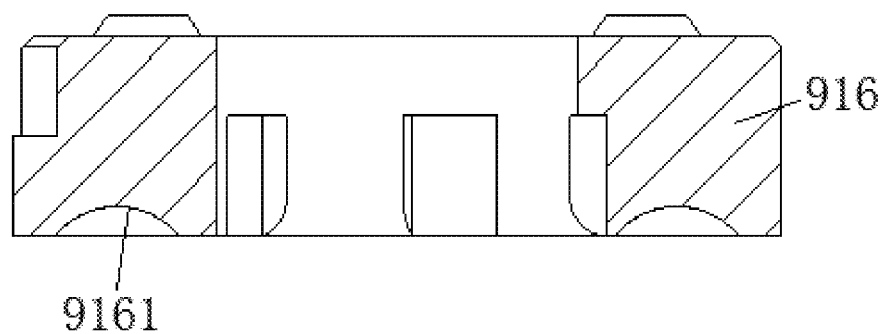
FIG. 23 is a transverse section view of the clutch gear unit of the main adjuster mechanism of the invention.
Figure 24:
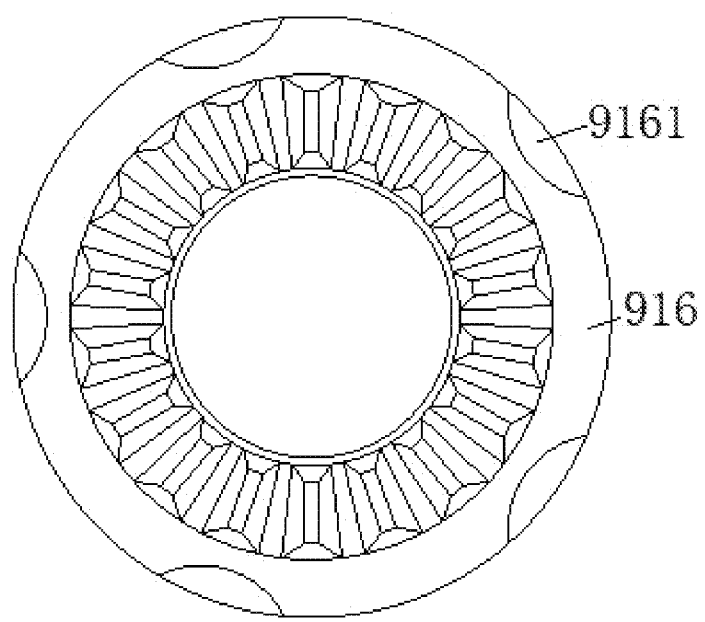
FIG. 24 is a schematic rear view of the clutch ring of the main adjuster mechanism assembly of the present invention.
Figure 25:
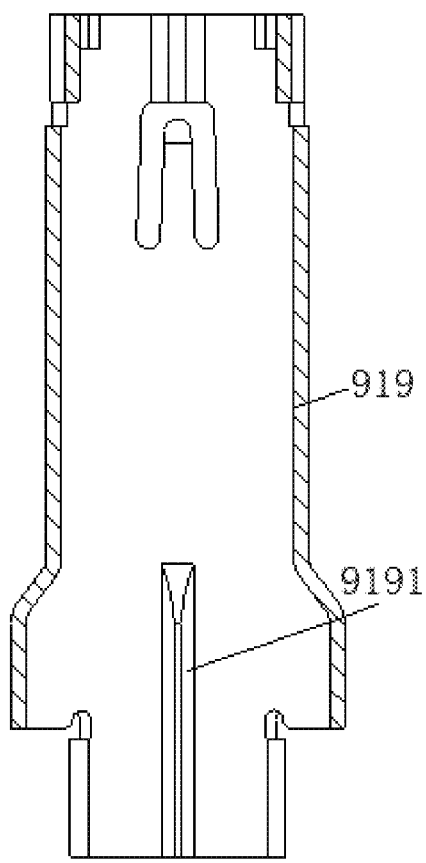
FIG. 25 is a sectional view of the outer dial of the main adjuster mechanism assembly of the present invention.
Figure 26:
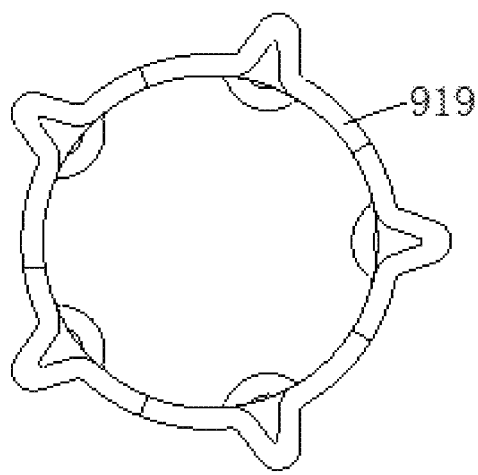
FIG. 26 shows the end face of the external set of the main adjuster mechanism of the invention.
Figure 27:
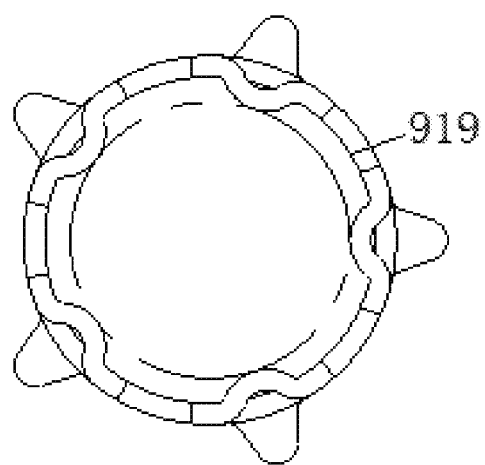
FIG. 27 shows the end face of the external set of the main adjuster mechanism of the invention.
Figure 28:
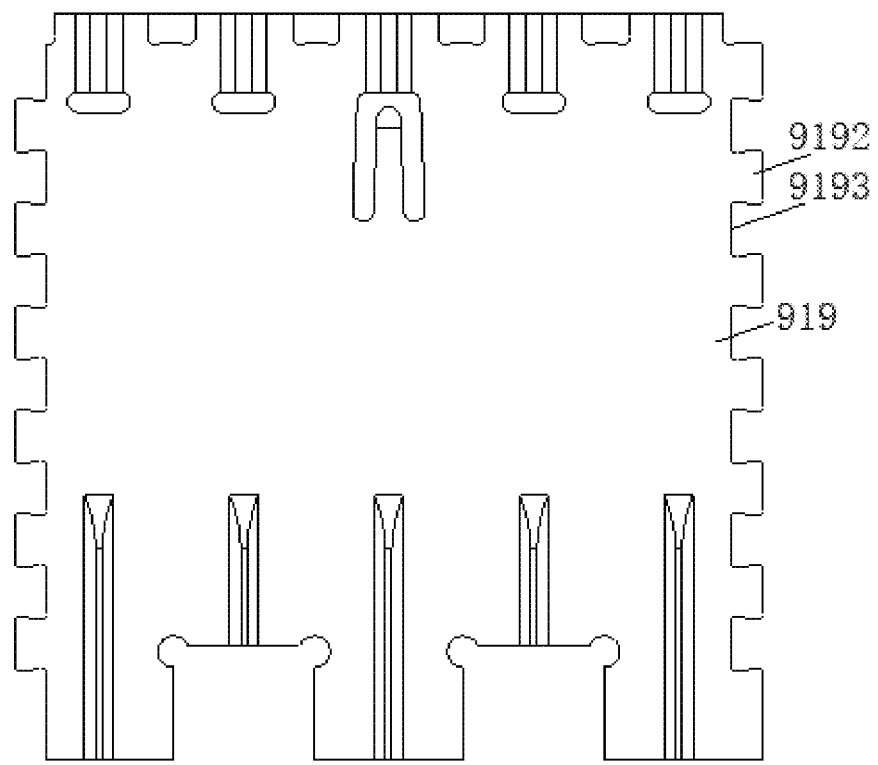
FIG. 28 is the expansion diagram of the outer set of the main adjuster mechanism of the invention.
Figure 29:
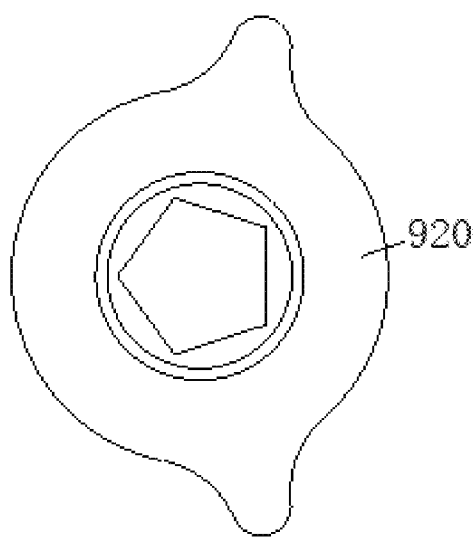
FIG. 29 is a positive schematic diagram of the inner block of the adjuster mechanism of the invention.
Figure 30:
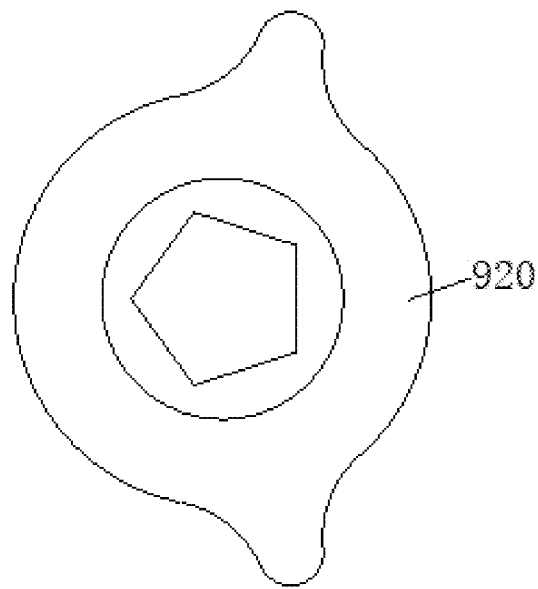
FIG. 30 shows the back diagram of the inner block of the adjuster mechanism of the invention.
Figure 31:
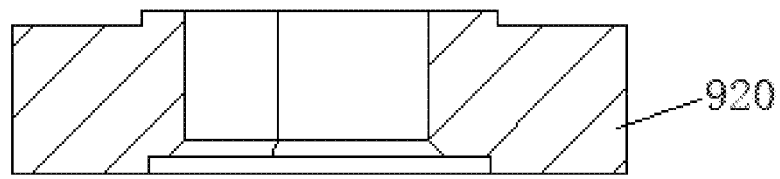
FIG. 31 is a section view of the internal allocation block of the adjuster mechanism of the invention.

Specifically, the left guide pin component includes a hexagonal bolt 15, the hexagonal bolt 15 is connected to the caliper body 12, the outside of the upper part of the hexagonal bolt 15 is connected to the short pin 5, the short pin 5 is sleeved with a short bushing 4 with a height of 25 mm, the outer side of the upper end of the short bushing 4 is sleeved with a support sleeve 3, there is skeleton oil seal 6 under the pin, which connected with caliper body 12. As shown in FIG. 7, the skeleton oil seal 6 is an integral structure, which replaced the traditional rubber boot and lock ring.

The right guide pin includes a second hexagonal bolt 28 that is connected to the caliper body 22, a long ear cap 29 are located at the top of it. The outer side is sleeved with a long guide pin 30. And long bushing 31 is sleeved on the outer side of the long guide pin 30, a lock ring 32 is mounted on the bottom of the second hexagonal bolt 28, and a dust cover rubber boot is installed on the long guide pin 30.

Figure 3:
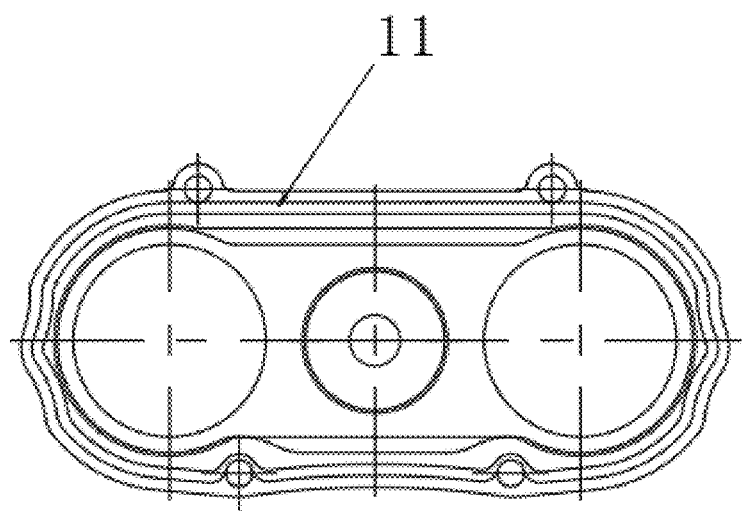
FIG. 3 is the structure diagram of the bottom cover of the invention.
Figure 4:
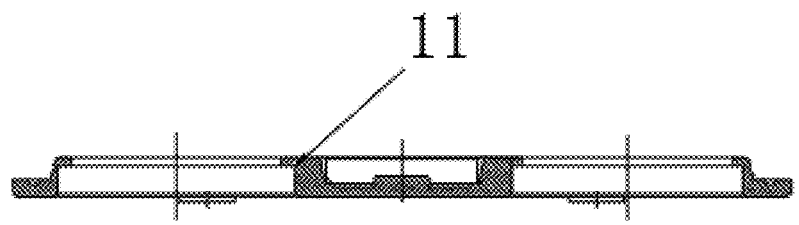
FIG. 4 is a sectional view of the bottom cover of the present invention.
Figure 5:
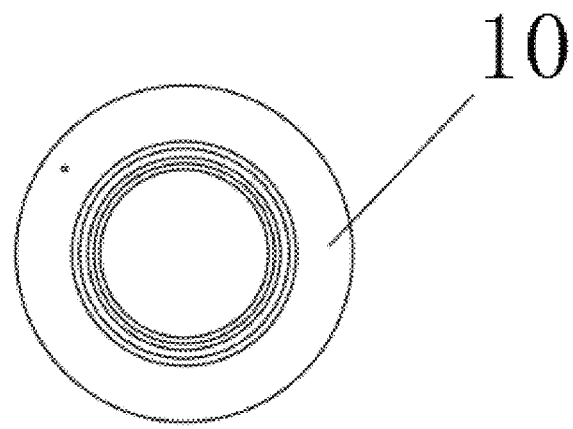
FIG. 5 is the structure diagram of the bridage dust cover of the invention.
Figure 6:
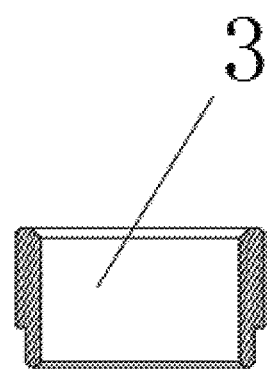
FIG. 6 is the structure diagram of the supporting sleeve of the invention.

The main adjuster assembly 9 and the driven adjuster unit 2 are located between the left guide pin and the right guide pin, the main adjuster member is near the left, the driven adjuster unit is near the right. They are respectively inserted into the left and right three thread bolt for torque transmission; the main adjuster assembly 9 is connected with fork of brake lever 1, the outer side of the upper part of the brake lever 1 is provided with roller bearings 22, and the bottom of the brake lever 1 is the bridage 23, there is a return spring 24 under the bottom of the bridage, the bridage are located in the inside of the caliper body 12. There is a bottom stamped steel cover 11 under the bottom of the caliper body 12, and a shaft seal 25 is arranged at the connection between the bottom stamped steel cover 11 and the bridage dust cover 10. The rod of the three thread bolt is directly embedded in the groove of the bottom cover 11, there is brake pad compression spring 27, which located inside of the caliper body 12 for compress of the brake pad. The structure of the bridage dust cover 10 is shown in FIG. 5, and the structure of the bottom cover 11 is shown in FIGS. 3 and 4.

The main adjuster assembly 9 is the ball type structure, including the main adjustment unit, the driven adjuster unit, and the plate unit. The main adjustment assembly can adjust the lack of braking clearance by itself to achieve the braking effect, the driven adjuster unit can eliminate the torsional forces of the brake lever when pressing down, so that protect the internal regulator components from damage. The main adjuster unit includes a fixed sleeve 95, support steel ball 96, transfer sleeve 97, support bearing 98, tension spring 99, limiting sleeve 910, adjustment ball 911, clutch gear sleeve 915, clutch gear 916 and outer sleeve 919; The driven adjuster unit includes a main rotation shaft 91, a compression spring 918, and an inner dial 920; the plate unit includes a reinforcing plate 92, a nylon pad 93, a fixing plate 94, a thick clutch pad 912, a thin clutch pad 913, and a limiting plate 914 And bearing spacer 917.

A reinforcing plate 92 and a fixing plate 94 are sleeved near the tip of the main shaft 91, and a nylon pad 93 is disposed between the reinforcing plate 92 and the fixing plate 94. The fixing plate 94 is a fixing plate made of pure metal without rubber parts. One end of the fixing plate 94 is provided with a hook-shaped bend, and a fixing sleeve 95 is arranged on the side of the fixing plate 94. The fixing sleeve 95 is provided with a guide fixing frame, the fixing sleeve 95 have Left and right openings, one end of the fixing sleeve 95 is provided with a spherical convex surface, and the other side of the fixing sleeve 95 is provided with a fixed sleeve ball socket 951. The spherical convex surface is matched with the fixing plate 94 and is hooked into the opening. The supporting steel ball 96 is arranged inside the fixed sleeve ball socket 951, and the transferring sleeve 97 is connected through the supporting steel ball 96. The diameter of the supporting steel ball 96 is 4 mm, it can slide freely within the fixed sleeve ball socket 951, and fixing. The opposite side of transfer sleeve 97 and the fixing sleeve 95 is provided with a transfer sleeve small ball socket 971 for supporting the installation of the steel ball 96. The fixed sleeve ball socket 951 and the transfer sleeve small ball socket 971 are installed with a support steel ball 96. The center of the transfer sleeve 97 is provided with a guide. The groove and the guide groove are cooperatively connected with the fixing sleeve 95. On the other side of the transfer sleeve 97 is provided with a dial groove 972 for brake lever fork, and a large ball socket 973 for mounting the ball, the large ball socket 973 shape includes large arcs and small arcs, The arc is connected through two arcs, the design of the special structure of transfer sleeve can ensure the steel ball to have moving track surface, which can ensure the free and smooth rolling of the steel ball. The middle of the transfer sleeve design guide groove, which can be matched with the fixed sleeve to guarantee the allocation. It can guarantee the transfer sleeve not over-rotate.

The transfer sleeve 97 is connected to the limiting sleeve 910 through a supporting bearing 98. The supporting bearing 98 is made of a high-temperature resistant and high-strength plastic material. It is upper and lower dislocation structures, which can be just used to facilitate the bearing steel ball to be embedded into the bearing seat. Near the side of transfer sleeve 97, the first limiting sleeve ball socket 9101 is designed under the bottom of limiting sleeve 910, the limiting sleeve ball socket are used for install adjuster steel ball 911; The adjuster steel ball 911 are installed between the first limiting sleeve ball socket 9101 and the transfer sleeve large ball socket 973. And on the other side, far away from the transfer sleeve 97, the second limiting sleeve ball socket 9102 is designed, the limiting sleeve ball socket are used for install adjuster steel ball 911; The transfer sleeve 97, the support bearing 98 and the limiting sleeve 910 are all sleeved on the fixed sleeve 95. The upper limiting sleeve 910 is connected with a tension spring 99. The tension spring 99 is provided with a fixing hook. The upper part of the tension spring 99 is fixed by a hook and the transfer sleeve 97 is fixed. The lower part of the tension spring 99 is fixed by a hook and the limiting sleeve 910, The inner ring of the support bearing 98 is connected to the clutch sleeve 915 by adjusting steel ball 911, the diameter of the steel ball 911 is 5.8 mm, On the side of the clutch gear sleeve 915, near the limit sleeve 910, there are clutch gear ball sockets 9151, which are used for the position of the steel ball 911, The steel ball 911 are installed in the clutch gear sleeve ball socket 9151 and second limit sleeve ball socket 9102, there are thick clutch washer 912 and thin clutch washer 913 between the clutch teeth 915 and fixing sleeve 95; the outer sleeve 919 is fitted on the clutch 915, the outer sleeve 919 is a cylindrical sleeve. The sleeve is formed by a crimping flat, The two sides of the flat body are alternately provided with protrusion 9192 and slot 9193. The upper part of the sleeve is provided with four dormers. The sleeve is also provided with viewing hole and limiting bar is arranged in the middle of the viewing hole. The inner wall of the under part of the sleeve is provided with five protruding ribs 9191. The outer wall of the sleeve is provided with protruding teeth, just the position of the compression spring 918, there are vent and limit port on the bottom of the sleeve, which are good for spring heat dissipation and movement and limit of the inner dial. The compression spring 918 is an extension type, By increasing the height of the spring, the spring force is increased to ensure that the adjust mechanism is more stable and reliable.

When the braking gap becomes too large, the brake lever will pressed down and drive the dial sleeve 97 to rotate. Under the action of the fixed sleeve 95 and the limiting sleeve 910, the dial sleeve 97 rotates on a certain angle, by the limit of the steel ball 911, the ball socket 973 and the first limiting sleeve ball socket 9101, drive the limiting sleeve 910 to rotate; then, drive it to rotate by the action of the steel ball 911 and the clutch sleeve 915; and drive clut ring 916 to rotate, which are engaged by the mutual meshing between the teeth. Then the clutch ring 916 drive the outer sleeve 919 to rotate, the outer sleeve 919 transfer the force to the threaded calibration bolt, and the threaded calibration bolt will move to make up the clearance and to achieve the brake effect automatically.

The limit plate 914 is fixed on the outside of the outer sleeve 919, the limiting plate 914 is a concave structure. Ten limiting protrusions are staggered from each other inside the limiting plate 914. Five limiting support protrusions are uniformly arranged on the outside of the limiting 914. It Not only has the limit function to prevent axial movement, but also has the limit role of radial movement.

The clutch gear sleeve 915 meshes with the clutch gear ring 916, and the clutch gear sleeve 915 fit with the main rotation shaft 91. On the outside of the clutch gear sleeve 915, there are evenly have clutch gear sleeve ball sockets 9151, the upper surface of the clutch gear sleeve 915 is flat, the under surface of the clutch gear sleeve 915 are rolling racks evenly distributed; The upper surface of the clutch gear ring 916 are matched with rolling racks evenly, the upper surface of the clutch gear ring 916 are coordinated with the under surface of the clutch gear sleeve 915, the under surface of the clutch gear ring 916 is clutch gear ring ball sockets 9161, the supporting steel ball 96 are put inside of the clutch gear ring ball sockets 9161, the limiting grooves are evenly distributed inside of the clutch gear ring 916, the limiting seats are evenly distributed outside of the clutch gear ring 916, the limiting seats have the function of limiting, which cooperated with outer dial sleeve 919.

Through the support ball 96 (located in the inner cavity of the outer dial sleeve 919), The clutch ring 916 is connected with the bearing washer 917, which also go though the main shaft 91. The opposite side of the clutch gear ring 916 and the bearing washer 917 are provided with clutch gear sockets, which are used for the support steel ball 96. When the brake clearance meets the requirement, the brake lever is depressed, but the threaded rod can not move, then the outer sleeve 919 and the clutch gear ring 916 cannot rotate, by overcoming the forces of the compression spring 918, the clutch gear sleeve 915 and the clutch gear ring are separated, which eliminate the brake lever torsion force, it will protect the internal parts from being damaged.

On one side of the main rotation shaft 91, which is away from the end of the reinforcement plate 92, The inner dial 920 is mounted by screws, the inner dial 920 just block the end of the out dial 919. Between the inner dial 920 and the bearing washer 917, there is a compression spring 918 sleeved on the main adjustment shaft 91. The two sides of the out dial sleeve 919 are alternately provided with a protrusion 9192 and a slot 9193. The two sides of the block 9192 and the slot 9193 are mutually plugged to form an overall outer dial sleeve 919. The inner wall of the outer dial sleeve 919 is provided with rib 9191. The ribs 9191 are circularly distributed and the outer wall is provided with five convex teeth, the convex teeth are used to toggle the threaded push rod. Two vent are opened at the interval convex teeth, limiting groove is formed on the upper part of the outer dial sleeve 919, and the groove is used to limit axial rotation of the ring gear 916, a strip for pressing the clutch ring gear 916 is designed at the under part of the groove, and openings are provided around the strip.

When the brake gap becomes too small, to use the wrench and torque protector to adjust the main rotation shaft 91. The main shaft 91 adjusts the thread push rod by the inner dial 920 to increase the brake gap. When the brake is braking, The adjuster mechanism will adjuster automatically, to meet the requirements of brake clearance and achieve braking effect.

The inner dial 920 is an irregular prismatic structure at both ends. The inner dial is installed at the bottom of the outer dial 919 for limiting and supporting the compression spring 918.

The adjuster mechanism assembly is an integral riveting structure maintenance-free adjustment mechanism. After all the adjustment mechanism parts are installed, the rear part of the main adjustment shaft is riveted through the limit to ensure that the overall adjustment mechanism is stable and reliable, and no falling-off problem occurs. The Maintenance-free structure avoids the misalignment or maintenance failure during the repeated disassembly and assembly.

A driving sprocket 18 is connected to the top of the main rotation shaft 91, and a driven sprocket (not labeled in the figure) is connected on the top of driven adjuster unit 2, The driving sprocket 18 and the driven sprocket connected through chain 19, the outer side of the driving sprocket 18 is further equipped with a rubber strip 20 and a plug 21. The driven adjuster rotating shaft is connected with the inner wall of the threaded push rod through the circlip, and a plastic dust cover 7 is disposed at the joint of the driven adjuster unit 2 and the caliper body 12, a gasket 8 is disposed at the joint of the the plastic dust cover 7 and the driven adjuster unit 2, a torque protector 17 is disposed on the top of the main rotating shaft 91 and encapsulated by the rubber cap 16. The gasket 8 adopts a unique rectangular structure, which changes the original cylindrical shape, the sealing gasket of the rectangular structure is much more closely and reliably cooperated with the brake caliper body, thereby improved the sealing effect and thoroughly solve the water leakage problem.

The work principle of the disc brake caliper assembly provided by this embodiment is as following: when the braking gap is too large, the brake lever is pressed down, drive the dial sleeve 97 to rotate. Under the action of the fixing sleeve 95 and the limiting sleeve 910, the dial sleeve 97 rotate to a certain angle, it lead the limiting sleeve 910 to rotate by adjusting the steel ball 911 and the limits of the dial sleeve large ball socket 973 and the first limiting sleeve ball socket 9101, and then, under the cooperation of the steel ball 911 and clutch gear sleeve 915, through the mutual meshing between the teeth, cause clutch gear ring 916 to rotate, the the out dial sleeve 919 also rotate at the same time, the out dial sleeve 919 transfer the rotation to the threaded rod, and the threaded rod generates displacement to automatically adjust the brake gap to achieve the brake effect;

When the brake gap meets the requirements, the brake lever is pressed down, the threaded rod cannot be displaced, so the outer sleeve 919 and the clutch ring 916 cannot rotate, by overcoming the pressure of the compression spring 918, the clutch sleeve 915 is separated from the clutch ring gear 916 to eliminate the torsional force generated by the brake lever to protect the internal parts of the adjuster mechanism from being damaged; when the brake gap is too small, to adjuster the main rotation shaft 91 by adjuster the torque protector with a wrench, the main rotation shaft 91 will dial the adjustment screw 920 to the threaded push rod, to increase the brake clearance, when braking, the automatic adjusting function will meet the clearance requirements to achieve the braking effect.

Example 2

A kind of commercial vehicle disc brake caliper assembly, the structure described in Embodiment 1, the difference is: the height of the short bushing 4 is 35 mm. According to actual processing conditions, the shortest bush height can be selected to be 35 mm in height. It is difficult to meet the fitting and installation requirements of the caliper if the height exceeds 35 mm.

Example 3

A kind of commercial vehicle disc brake caliper assembly, the structure described in Embodiment 1, the difference is: the height of the short bushing 4 is 30 mm, the height is just exactly fit the demand for caliper, It can not only increase the sliding stroke of the short stud, but also ensure the short sleeve wear resistance and better guide ability, at the same time, it is more convenient for machining.

Example 4

A kind of commercial vehicle disc brake caliper assembly. The structure is described in embodiment 1. The difference is: the bottom cover and the caliper body are connected by four bolts. The bottom cover is casting material, which has a large thickness and high strength, it only need four bolts to fix and tighten, which is half the number of bolts than a conventional stamped dustproof plate. This also reduces processing of machining difficulty of caliper body, and reduces some some unnecessary processes.

Example 5

A kind of commercial vehicle disc brake caliper assembly. The structure is described in embodiment 1. The difference is: The vent 34 is formed on one side of the caliper body 12, a sealing ring is arranged at the connection of the vent 34 and caliper, a dustproof net is installed at the end of the vent 34, and a clamping plate is arranged on the outside of the vent 34, the caliper body 12 and the clamping plate are connected by a rotating shaft and a rotating shaft sleeve, the rotating shaft is connected with the clamping plate, and the rotating shaft sleeve are connected with the clamping plate by a return spring.

What is claimed is:
1. A commercial vehicle disc brake caliper assembly, includes the following features:
   a caliper body, a caliper carrier installed on the outside of the caliper body, a pin shaft and a first hexagon socket head cap screw are internally installed in the caliper body, and a left guide pin component and a right guide pin component are respectively mounted on each side of the caliper body;
   an adjuster mechanism assembly, adopts a gear clutch to prevent overload;
   a driven adjuster unit is a circlip structure;
   the adjuster mechanism assembly and the driven adjuster unit are located between the left guide pin and the right guide pin, a top of the adjuster mechanism assembly and a top of the driven adjuster unit are connected through a sprocket chain, and bottom of the adjuster mechanism assembly and the driven adjuster unit are connected to one side of the caliper body through a bridge dust cover; and the adjuster mechanism assembly and the driven adjuster unit are connected through a brake lever, roller bearings are arranged on an outer side of a upper part of the brake lever, under the brake lever, a bridge unit is arranged, a return spring is arranged at the bottom of the bridge unit; three thread calibration bolts are arranged on two side of bridge holes;
   wherein the adjuster mechanism assembly comprises a main rotation shaft, a reinforcing plate and a fixed plate are sleeved at the end of the main rotation shaft; a nylon pad is arranged between the reinforcing plate and a fixing plate; on one side of the fixing plate, a fixing sleeve, a supporting steel ball, a dial sleeve, a supporting bearing, a limiting sleeve, an adjusting steel ball, and a clutch tooth sleeve and an out sleeve are arranged on a main adjusting shaft in turn; an outer side of a limit sleeve is connected with a tension spring; a thick clutch washer and a thin clutch washer are arranged between the limit sleeve and the clutch tooth sleeve; an outer sleeve is provided with a limiting plate; a clutch gear ring which matched with the clutch gear sleeve is arranged inside of the outer sleeve; on one side of the clutch gear ring, a support steel ball, a bearing washer and a compression spring are arranged in turn inside of the out dial sleeve; on the end of the main rotation shaft, an inner dial block and the compression spring are arranged.

2. The commercial vehicle disc brake caliper assembly according to claim 1, wherein the left guide pin component comprises a hexagonal bolt which is connected with the caliper body, on outside of the hexagonal bolt, a short pin, a short pin bushing and support sleeve are connected in turn; a skeleton oil seal is arranged at a joint between a short pin and the brake caliper body; a height of a short bush is 25-35 mm.

3. The commercial vehicle disc brake caliper assembly of claim 1, wherein the right guide pin comprises a second hexagonal bolt which is connected to the caliper body, on outside of the second hexagon bolt, a long guide sleeve, a long bushing are sleeved in turn, a long lug cap is arranged at top of the second hexagonal bolt, a lock ring is arranged at bottom of the right guide pin, the lock ring are connected with a guide sleeve rubber boot.

4. The commercial vehicle disc brake caliper body assembly according to claim 1, wherein the fixing plate is a metal plate, and one end of the fixing plate is provided with a hook-shaped bend; the fixing sleeve is provided with a guide fixed frame, the left and right side of the fixed sleeve each have an opening; the fixed sleeve has a spherical convex surface on one side; the fixed sleeve has fixed sleeve ball sockets on other side of the spherical convex surface; the spherical convex surface matches the fixed plate and the hook-shaped bend connects to the opening; the supporting steel balls is arranged in the fixed sleeve ball sockets;

the dial sleeve has a shift fork structure; the center of the dial sleeve is provided with a guide groove and the guide groove is matched with the fixed sleeve; on one side of the dial sleeve, there are small ball sockets for supporting steel balls, and on the other side of the dial sleeve, there are big ball sockets for steel balls; each of the big ball sockets includes a large arc and a small arc, the large arcs and small arcs are connected by two arcs;

the upper end surface of the limit sleeve is matched with the lower end surface of the dial sleeve, and first limit sleeve ball sockets for steel balls is arranged on the upper surface of the limit sleeve; the steel ball is placed on the first limit sleeve ball sockets and fixed by a tension spring; under the bottom surface of the limit sleeve, the limit sleeve is a concave structure, second limiting ball sockets are arranged with steel ball inside;

the tension spring is provided with a fixing hook, the upper part of the tension spring is fixed by the hook, and the lower part of the tension spring is fixed by a hook to fix the limit sleeve.

5. The commercial vehicle disc brake caliper assembly according to claim 1, wherein the limiting plate is a concave structure, and there are ten staggered limiting protrusions inside the limiting plate; there are five uniform limit support protrusions on the outside of the plate;

the inner part of the clutch sleeve cooperates with the main rotation shaft, and the clutch sleeve ball socket is evenly distributed on the outer of the clutch sleeve; the upper surface of the clutch sleeve is flat, and the rolling racks are evenly distributed on the lower surface of the clutch sleeve; there are rolling racks on the upper surface of the clutch gear ring, and the upper end of the clutch gear ring is matched with the lower end surface of the clutch sleeve; the clutch gear ring is provided with clutch gear ring ball sockets under the surface of the clutch gear ring; the supporting steel balls are placed in the clutch gear ring sockets; an inner slot is evenly distributed inside of the clutch gear ring, and the outer of the clutch gear ring is uniformly distributed with limit seats, which cooperated with an outer dial sleeve with the limit seats;

the outer sleeve is a cylindrical sleeve, the sleeve is formed by crimping a planar body;

the two sides of the planar body are alternately provided with bumps and slots, and the upper part of the sleeve is provided with sunroof openings; the sleeve is also provided with a hole, and a limiting bar is arranged in the middle of the hole; five ribs are arranged on the inner wall of the sleeve; the outer wall of the sleeve is provided with protruding teeth, the compression spring is installed under the bottom of the sleeve, and the position have vents and limits;

inner dial sleeve booth ends are prismatic structures; the inner dial sleeve is installed at the bottom of the outer dial sleeve for limiting and supporting of the compression spring.

6. The commercial vehicle disc brake caliper assembly according to claim 1, wherein on the top of the main rotation shaft, a drive sprocket is connected with it; on the top of the driven adjuster unit, a driven sprocket is connected with it; the driving sprocket and the driven sprocket are connected by a chain, and a plastic dust cover is arranged at a joint of the driven adjuster unit and the brake caliper body, a gasket is arranged at a joint of the driven adjuster unit and the plastic dust cover; on the top of the main rotation shaft, a torque protector is provided and encapsulated by a rubber cover.

7. The commercial vehicle disc brake caliper body assembly according to claim 1, wherein a bottom cover is arranged at a joint of the caliper body and the bridge dust cover, a shaft seal is arranged at a joint of the bridge dust cover and the bottom cover, the bottom cover is connected with the caliper body by four bolts.

8. The commercial vehicle disc brake caliper assembly according to claim 1, wherein a vent is formed on one side of the caliper body, and a dustproof net is installed on an end of the vent; an outside of the vent is provided with a clamping plate.

9. The commercial vehicle disc brake caliper assembly according to claim 1, wherein the bridge dust cover is a self-locking spring leaf skeletal structure.

* * * * *